United States Patent
Anders et al.

(10) Patent No.: US 10,372,813 B2
(45) Date of Patent: Aug. 6, 2019

(54) SELECTIVE CONTENT DISSEMINATION

(71) Applicant: International Business Machines Corporation, Armonk, NY (US)

(72) Inventors: Kelley L. Anders, East New Market, MD (US); Paul R. Bastide, Boxford, MA (US); Jonathan Dunne, Dungarvan (IE); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/407,332

(22) Filed: Jan. 17, 2017

(65) Prior Publication Data
US 2018/0203842 A1   Jul. 19, 2018

(51) Int. Cl.
*G06F 17/27* (2006.01)
(52) U.S. Cl.
CPC .................. *G06F 17/2705* (2013.01)
(58) Field of Classification Search
CPC ......... G06F 17/30525; G06F 17/30554; G06F 17/30011; G06F 17/30017
See application file for complete search history.

(56) References Cited

U.S. PATENT DOCUMENTS

| | | | |
|---|---|---|---|
| 7,287,219 B1 | 10/2007 | Young et al. | |
| 7,809,695 B2 | 10/2010 | Conrad et al. | |
| 8,131,726 B2 | 3/2012 | Broder et al. | |
| 8,750,624 B2 | 6/2014 | Kletter | |
| 2003/0074345 A1* | 4/2003 | Baldwin | G06F 17/218 |
| 2005/0130114 A1* | 6/2005 | Bantz | G09B 5/00 |
| | | | 434/362 |
| 2005/0198056 A1* | 9/2005 | Dumais | G06F 16/9535 |
| 2005/0262051 A1* | 11/2005 | Dettinger | G06F 16/24573 |
| 2009/0187581 A1 | 7/2009 | Delisle et al. | |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Stephen S Hong
*Assistant Examiner* — Ahamed I Nazar
(74) *Attorney, Agent, or Firm* — Law Office of Jim Boice

(57) ABSTRACT

A computer-implemented method disseminates content over a network. One or more processors parse a first document into first content sections that are devoted to first topics. Processor(s) assess each of the first content sections to determine a level of expertise, of a user, for each topic from the first set of topics. Processor(s) parse a second document into second content sections that are devoted to second topics. Processor(s) compare one or more of the second content sections with one or more of the first content sections to determine a relevance parameter for the user. The relevance parameter describes the level of expertise, of the user, for each topic from the first set of topics that is also found in the second document. Processor(s) utilize the relevance parameter to identify and retrieve, via a network, only passages from the second document that provide new information to the user.

20 Claims, 6 Drawing Sheets

(56) References Cited

U.S. PATENT DOCUMENTS

| | | | |
|---|---|---|---|
| 2011/0161139 A1* | 6/2011 | Maheshwari | G06Q 10/06 705/7.42 |
| 2014/0013353 A1* | 1/2014 | Mathur | G06F 17/30867 725/34 |
| 2014/0040718 A1* | 2/2014 | Rein | G06Q 10/103 715/224 |
| 2014/0101086 A1* | 4/2014 | Lu | G06N 5/02 706/46 |
| 2015/0074145 A1* | 3/2015 | Homer | G06F 16/93 707/772 |
| 2015/0081681 A1 | 3/2015 | Vohra et al. | |
| 2015/0248398 A1* | 9/2015 | Weiss | G06F 16/335 434/362 |
| 2016/0048772 A1* | 2/2016 | Bruno | G06N 5/04 706/11 |
| 2016/0203215 A1* | 7/2016 | Allen | G06F 16/334 706/46 |
| 2018/0203842 A1* | 7/2018 | Anders | G06F 17/2705 |

OTHER PUBLICATIONS

Anonymous, "Aggregating Multiple Relevant Contents Intoa Single Archive". ip.com, IPCOM000240077D, Dec. 29, 2014.

Anonymous, "Measures of Association". Statistics Solutions, Web Jan. 11, 2017. <http://www.statisticssolutions.com/directory-of-statistical-analyses-correlation-measures-of-association/>.

* cited by examiner

202

| A | 1 | 2 | 3 |
|---|---|---|---|
|   | Topic A1 | Topic A2 | Topic A3 |

204

|   | 1 | 2 | 3 |
|---|---|---|---|
| X | Topic X1/A1 (>75%) | Topic X2/A2 (<25%) | Topic X3/A3 (75% - 25%) |
| Y | Topic Y1/A1 (>75%) | Topic Y2/A2 (75% - 25%) | Topic Y3/A3 (>75%) |
| Z | Topic Z1/A1 (<25%) | Topic Z2/A2 (<25%) | Topic Z3/A3 (<25%) |

206

| Document Name | Document Subject | Document Age (Days) | Readable/New Regions (>75%) | Readable/New Regions (75% - 25%) | Readable/New Regions (<25%) |
|---|---|---|---|---|---|
| Title X | Subject X | 345 | X2 | X1 | X3 |
| Title Y | Subject Y | 126 | Y1, Y3 | Y2 | --- |
| Title Z | Subject Z | 2 | --- | --- | Z1, Z2, Z3 |

You already know about Lorem Ipsum. No  307
need to read this section

Etiam egestas viverra placerat. Ut venenatis lectus non lacus mollis congue. Quisque dignissim eros in tellus rhoncus, id dignissim sapien porttitor. Ut rutrum felis eget mauris imperdiet, eu facilisis lorem aliquet. Nunc hendrerit, mauris nec dictum viverra, diam velit sollicitudin mauris, suscipit interdum ipsum ipsum nec ante. Nullam eget cursus massa. Suspendisse ac lacus pretium, rhoncus libero in, mollis neque. Mauris at turpis sit amet mauris hendrerit vehicula eget sit amet arcu. Sed tellus lectus, rutrum quis rhoncus eget, volutpat in orci. Ut nec cursus ante, nec rutrum quam. Nullam auctor hendrerit eleifend. Sed suscipit leo non viverra dictum. Morbi finibus dictum nunc nec semper. Nullam ultrices ex sed dolor iaculis, et auctor sem dignissim.

305

309   The new document is 70% similar to Lorem Ipsum.
Here is a summary of its new content Lorem ipsum dolor sit amet, consectetur adipiscing elit. Nunc sodales elit quis sem elementum placerat. Nunc vestibulum purus sed sodales maximus. Donec gravida convallis eros vel fringilla. Duis at eros efficitur, gravida lorem vel, congue purus. Curabitur euismod blandit justo, sed facilisis urna tristique ut. Integer eget hendrerit eros, nec viverra nisl. Suspendisse potenti.

Aenean cursus fringilla justo, eu pharetra risus scelerisque at. Nam commodo ligula urna, blandit elementum urna laoreet non. Aenean vestibulum sodales justo, nec dapibus sapien faucibus sed. Phasellus et hendrerit libero, fringilla consectetur neque. Interdum et malesuada fames ac ante ipsum primis in faucibus. Ut lobortis enim velit, non dignissim felis porttitor a. Aenean sodales bibendum tincidunt. Aliquam erat volutpat. Aliquam et tellus ut ante bibendum blandit at eu ipsum.

SELECTIVE CONTENT DISSEMINATION

BACKGROUND

The present invention relates to the field of computers, and particularly to computers that are on networks. More particularly, the present invention relates to selectively disseminating content via a network based on a level of content expertise for a user.

SUMMARY

In one or more embodiments of the present invention, a computer-implemented method disseminates content over a network. One or more processors parse a first document into first content sections such that the first content sections are parsed according to a first set of topics, where each of the first content sections is devoted to a particular first topic from the first set of topics. Processor(s) assess each of the first content sections to determine a level of expertise, of a user, for each topic from the first set of topics. Processor(s) parse a second document into second content sections such that the second content sections are parsed according to a second set of topics, where each of the second set of topics is devoted to a second topic from the second set of topics. Processor(s) compare one or more of the second content sections with one or more of the first content sections to determine a relevance parameter for the user. The relevance parameter describes the level of expertise, of the user, for each topic from the first set of topics that is also found in the second document. Processor(s) utilize the relevance parameter to identify and retrieve, via a network, only passages from the second document that provide, for the user, new information for which the user has a level of expertise that is below a predetermined level, and then display only the new information to the user.

The described invention may also be implemented in a computer system and/or as a computer program product.

BRIEF DESCRIPTION OF THE DRAWINGS

FIG. 2 illustrates an exemplary comparison of an existing document to new documents with regard to an amount of new information for a user who is already familiar with the existing document in accordance with one or more embodiments of the present invention;

FIG. 3 depicts a user interface displaying selectively filtered content in accordance with one or more embodiments of the present invention;

DETAILED DESCRIPTION

Figure 1:
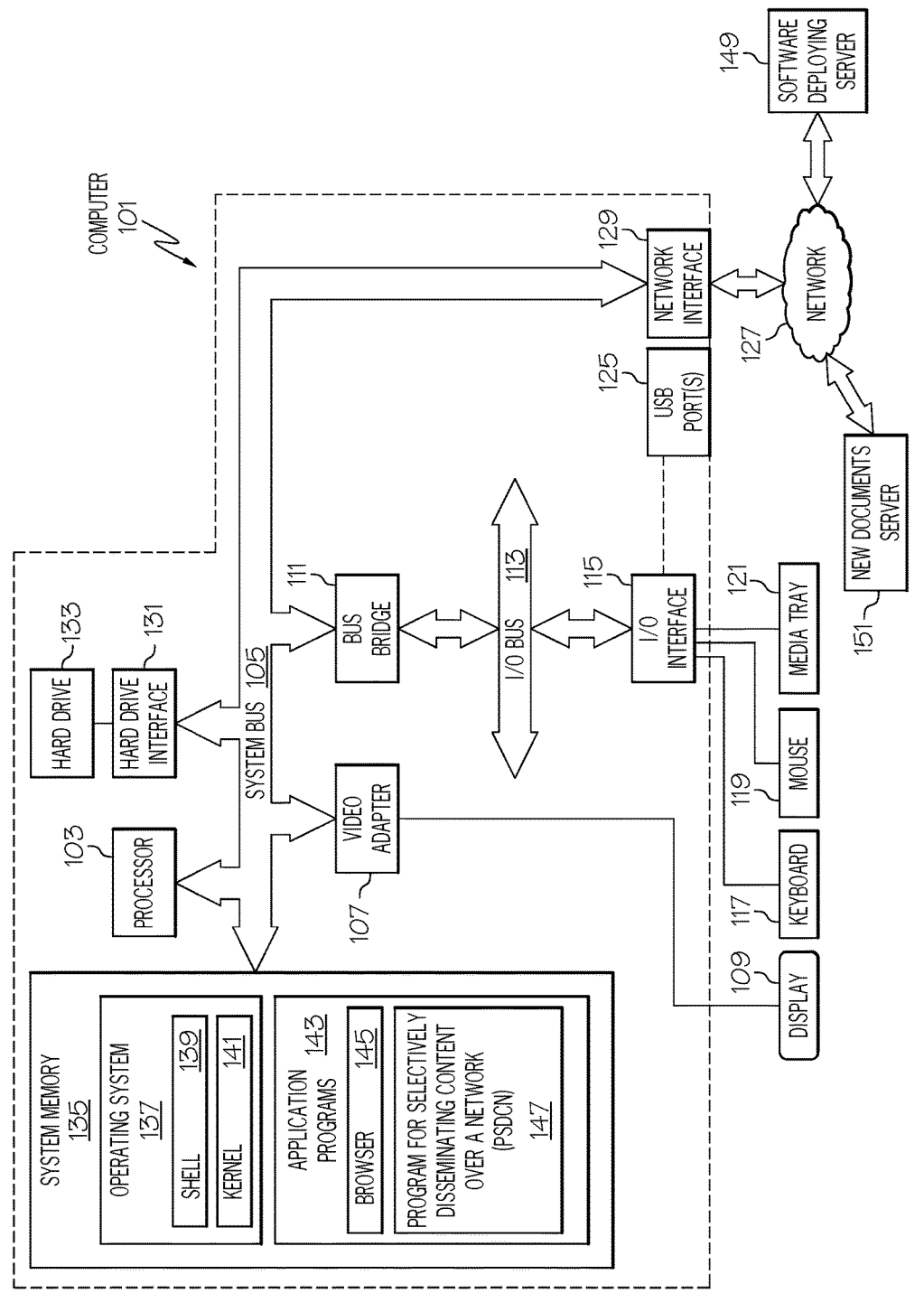
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or new documents server 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Selectively Disseminating Content over a Network (PSCDN) 147. PSCDN 147 includes code for implementing the processes described below, including those described in FIGS. 2-4. In one embodiment, computer 101 is able to download PSCDN 147 from software deploying server 149, including in an on-demand basis, wherein the code in PSCDN 147 is not downloaded until needed for execution. In one embodiment of the present invention, software deploying server 149 performs all of the functions associated with the present invention (including execution of PSCDN 147), thus freeing computer 101 from having to use its own internal computing resources to execute PSCDN 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

In large organizations teams can work on a specific project or process unaware that other teams may be conducting similar but different work in parallel. Typically the way teams integrate and consolidate their documentation and processes is to undertake cross team initiatives with a view to sharing best practices. Additionally, other ways of ensuring relevant documentation is available to a wider organization is to ensure that documentation becomes "social". In this way, documents can take the form of wikis and blog postings, these allowing the idea of tagging. When a user searches for a tag, a relevant document is returned.

While these technologies are useful, none of them solve the problem that currently exists around documents which contain both similarities and differences. Having multiple documents which contain similar multiple instances of the same content can be challenging. For example, when indexing these documents the issue of determining how one ranks one document over another is difficult to resolve, particularly with regard to what a user knows or does not know about information in the documents.

As such, the present invention presents a system in which existing collaboration/social documents are divided into regions, and the topic-identified content of the documents is assessed to determine how familiar a user is with the information. The content of the documents can be checked for reading statistics/metrics of the user, in order to establish the user's level of familiarity with certain topics. Document content is compared between prior and newly available content and a relevance parameter is derived. The relevance parameter defines how familiar a particular user is with information in the newly available content, based on the user's familiarity with the prior content. The relevance parameter is then used to identify duplicate/similar content regions between documents, such that only new information is presented to the user.

In various embodiments of the present invention, the comprehension/difficulty of subject matter is factored into making the decision as to whether or not it would be helpful for a user to re-read duplicate information.

In one or more embodiments of the present invention, content found in the prior and/or new documents is specific to a user, group, or profile. The topic content of the prior and/or new documents is thus assessed based on not only surrounding paragraphs and part of the relevance coefficient (e.g., text analysis), but also the context of the user. For example, assume that a passage from a document is assessed to be related to a certain topic. Assume further that the user is an expert in this topic (based on being part of a group that works with this topic, has a profile that states that the user is an expert on this topic, etc.), has a need (based on the requirements of a certain project, etc.) to know about that topic, and therefore maintains a proficiency in this topic (keeps "up to date" on new developments via journals, blogs, publications, etc.). Thus, any new documents that have information that the user is an expert in will not be displayed to that user. However, if the user is not an expert in this topic (based on not being part of a group that works with this topic, has a profile that states that the user is not an expert on this topic, etc.), and yet still has a need (based on the requirements of a certain project, etc.) to know about that topic, then any new documents that have information that the user will need are displayed to that user.

As described herein, information that does not need to be displayed to a user (based on the user's level of expertise/knowledge with that information) is de-emphasized (e.g., "greyed out") and new content that this user needs to see is highlighted and/or summarized for this user.

Thus, the present invention not only matches and highlights or emphasizes a region that is similar in prior and new documents, it also makes note of the user's skill level and/or experience with the subject matter/topics in the documents. For example, the present invention can advise the user to skip a section that has information/content that the user already knows. In one or more embodiments, the "new" passage is highlighted to show that it has been several years (or some other predetermined length of time) since the user has read material related to a particular topic, and therefore the user needs to re-read it.

Thus, the present invention focuses on content to be dynamically analyzed based the user's experience with that content and thus the level of expertise with a particular topic, and then emphasizes areas in new documents that the user should read as well as areas in the new documents that can be skipped by the user.

With reference now to FIG. 2, an exemplary comparison of an existing document to new documents with regard to an amount of new information for a user who is already familiar with the existing document is presented in accordance with one or more embodiments of the present invention.

Assume that a user is familiar with the information found in existing document 202 (also identified as document A). For example, the user may have already read some or all of existing document A, may have written some or all of existing document A, has taught a course on the information/topics found in existing document A, etc., as revealed in a profile about that user.

Within existing document A are passages/sections related to Topic A1, Topic A2, and Topic A3, as represented by the cells shown in FIG. 2. For example, assume that existing document A is about computer programming in Java, and that Topic A1 is about syntax that must be followed when programming in Java, Topic A2 is about how to deploy Java programs to a remote computer, and Topic A3 is about security policies that should be adhered to when deploying Java programs to remote computers.

Assume now that there are new documents 204 that the user has not read. These new documents 204 are depicted as documents X, Y, and Z. For purposes of illustration, assume that each of the new documents 204 are parsed out into three passages/sections that correspond to the three topics shown for existing document 202. That is, all passages in the "1"

column for new documents 204 are related to Java syntax (as in the "1" column for the existing document 202); all passages in the "2" column for new documents 204 are related to deploying Java programs (as in the "2" column for the existing document 202); and all passages in the "3" column for new documents 204 are related to Java security issues (as in the "3" column for the existing document 202).

The content from new documents 204 is described in each of the cells as a combination of new information and old information for the user. For example, in cell X:1, the content is labeled as "Topic X1/A1" to indicate that it contains new information (X1) as well as old information from existing document A (A1). As shown in cell X:1, >75% of the information in the passage represented by cell X:1 for new document X is not found in the passage represented by cell A:1 for existing document A.

However, the user may or may not be familiar with all of the information found in each of the passages/sections in the new documents 204. For example, consider the section in new document X identified as being related to "Topic X1/A1" (i.e., Java syntax issues). Assume now that the user who is familiar with Topic A1 from existing document A is unfamiliar with more than 75% of the information found in the passage found in new document X for "Topic X1/A1". That is, in new document X, more than 75% of the passage devoted to Java syntax issues (within cell X:1—identified by the label "Topic X1/A1") is new information for the user who is familiar with document A (i.e., new information that the user does not know).

Various processes can be used to determine that the user who is familiar with existing document A is unfamiliar with more than 75% of the information found in the passage found in new document X (for "Topic X1/A1"). For example, text analysis can be used to identify key words and their frequency, metadata describing passage subjects, ontological analysis of the passages, etc. Once the topics/content of each passage in existing document A are defined and quantified, they are stored in a database.

In an embodiment of the present invention, the level of familiarity with a particular passage in the existing document A is depicted in a "heat map", which shows how much of a particular passage has been read (or is otherwise familiar to) the user. For example, the passage shown in cell A:1 may be a fifty page passage related to Java syntax. If the user is very familiar with all of the passage (based on how many times the user has read this passage, if the user has taught a course on this passage, how recently the user has read this passage, etc.), then the heat map will show a color indicating this high level of expertise in Java syntax as taught by this passage. However, if the user is only slightly familiar with all of the passage, then the heat map will show a different color indicating a low level of expertise in Java syntax as taught by this passage.

When a new document (e.g., new document X) is received (e.g., by computer 101 and from new documents server 151 shown in FIG. 1), then new document X is analyzed in a similar manner as that described for existing document A, in order to 1) identify the various sections of new document X according to their topics and content (e.g., cell X:1— identified by the label "Topic X1/A1"); and to 2) determine the amount of overlap (or lack thereof) of content between the information found in cell A1 (identified as being related to "Topic A1") from existing document A and the content found in cell X1 (identified as being related to "Topic X1/A1") for new document X.

As shown in FIG. 2, the person who is familiar with the information ("Topic A1"—Java syntax) depicted for cell A:1 in existing document A is unfamiliar with over 75% of the material found in the passage in new document X that is depicted in cell X:1 ("Topic X1/A1"), even though Topic X1/A1 is also related to Java syntax. As such, over 75% of the material represented by cell X:1 will be shown to the user, while the remainder will be hidden.

For example, as shown in FIG. 3, assume that partially obscured new document 303 is the new document X shown in FIG. 2. As shown in FIG. 3, the user interface 301 (on a computer such as computer 101 shown in FIG. 1 that is being used by the user) displays the >75% of material in document X with which the user is unfamiliar (section 305), while obscuring (or even blocking from being transmitted over network 127 from new documents server 151 to computer 101 shown in FIG. 1) the remaining <25% of material in document X with which the user is already familiar (section 307).

In an embodiment of the present invention, a summary 309 of section 305 is presented in lieu of presenting section 305 to the user (i.e., without displaying on computer 101 or even retrieving from new documents server 151 section 305).

Returning to FIG. 2, other passages from new document X as well as new documents Y and Z are evaluated to determine the amount of overlap between what the user has already learned from one or more earlier documents (e.g., existing document 202) and one or more new documents (e.g., one or more of the new documents 204). For example, in new document X the user is unfamiliar with less than 25% of the material represented in cell X:2 ("Topic X2/A2"). Similarly, in new document X the user is unfamiliar with between 75% and 25% of the material represented in cell X:3 ("Topic X3/A3").

This information is used to populate a table 206, which is used to determine which of the new documents 204 will be presented at all to the user who has read (or is otherwise familiar with the material in) existing document 202. More specifically, the content within table 206 is used to calculate a relevance parameter for whether a new document is worth showing to the user. This relevance parameter is established according to "Formula 1", which states:

$$RP=DocName(W1)+DocSub(W2)+DocAge(W3)+ReadReg75(W4)+ReadRed75/25(W5)+ReadReg25(W6)$$

where:
RP=Relevance Parameter,
DocName=a derived relevance of the new document to the existing document based on the title of the new document,
DocSub=a derived relevance of the new document to the existing document based on the subject of the new document,
DocAge=an inverse of age of the new document;
ReadReg75=a quantity or percentage of passages in the new document that contain more than 75% new material with which the person who is familiar with the existing document is unfamiliar,
ReadReg75/25=a quantity or percentage of passages in the new document that contain between 75% and 25% new material with which the person who is familiar with the existing document is unfamiliar,
ReadReg25=a quantity or percentage of passages in the new document that contain less than 25% new material with which the person who is familiar with the existing document is unfamiliar, and
W1, W2, W3, W4, W5, and W6 are weighting values.

Weighting values (e.g., W1, W2, W3, W4, W5, and W6) may initially be arbitrarily set, and then later adjusted by the system based on how well they generate an RP that describes whether or not a new document is worth showing to a particular user. For example, assume that a value of 200 has been set as the demarcation for relevant versus irrelevant documents. That is, if a particular new document has an RP above 200, then it is presented (with the obscuring and summarizing described herein) to the user. However, if the RP is below 200, then it is not presented to the user at all.

In order to determine the final values of the weighting values, an initial value is assigned to each the weighting values. For example, a weight for DocSub may be given a high value (e.g., 0.5690), while the weight for ReadReg25 may be given a low value (e.g., 0.001). This gives the value for DocSub greater weight when determining whether or not a new document does or does not reach an RP value of 200 as compared to ReadReg25. Assume now that a test new document is known to contain a significant amount of new information for a user who is familiar with a test existing document. As such, the weights (e.g., W1, W2, W3, W4, W5, and W6) are modified until the RP value for the test new document exceeds (beyond some predefined amount) the value of 200. Different iterations of such modified weights are then run against other known test new documents until weight values are identified that most consistently present an RP value over 200 for the test new documents.

For example, to establish a value for DocName, assume that for the title "Title X" for new document X, a value of 90 (e.g., on a scale of 1-100) has been derived to show the level of relevance between the material in new document X and that found in existing document A. That is, an analysis (e.g., a historical analysis and/or text analysis of the documents themselves) may show that any documents whose titles include the phrase "Title X" will have a relevance level of 90 to the material found in existing document A. This factor is moderately important, and thus W1 is given a value of 0.446.

To establish a value for DocSub, assume that for the subject "Subject X" for new document X, a value of 95 (e.g., on a scale of 1-100) has been derived to show the level of relevance between the material in new document X and that found in existing document A. That is, an analysis (e.g., a historical analysis and/or text analysis of the documents themselves) may show that any documents whose subject has been determined to be related to "Subject X" will have a relevance level of 95 to the material found in existing document A. This factor is more important than that for the title, and thus W2 is given a value of 0.5690.

In the example of new document X, the value for DocAge is 345 (days). That is, if a "new" document is actually 345 days old, then the inverse (1/345) shows that this document is likely not very important. However, if the "new" document is only 2 days old (e.g., see new document Z in table 206), then this new document is more important. In an alternative embodiment of the present invention, the value for DocAge is not inverted. That is, older documents are given greater weight than newer documents, since the user may have forgotten about them (e.g., if the documents are emails). In the example of new document X then, the value for DocAge is 1/345 (0.0029). This factor is very important, and thus W3 is given a value of 0.8996.

In the example of new document X, the value of Read-Reg75 is 1 (since there is only one section that has more than 75% new material for the user). This value is moderately important, and thus W4 is set at 0.4455.

In the example of new document X, the value of Read-Reg75/25 is also 1 (since there is only one section that has between 25% and 75% new material for the user). This value is less important, and thus W5 is set at 0.334.

In the example of new document X, the value of Read-Reg25 is 1 (since there is only one section that has less than 25% new material for the user). This value is unimportant, since material that provides no new information to the user is not useful, and thus W6 is set at 0.001.

Thus, for new document X the Formula 1 shown above would resolve to:

$$RP = 90(0.446) + 95(0.5690) + 0.0029(0.8996) + 1(0.4455) + 1(0.334) +$$
$$1(0.001) = 40.1 + 54.4 + 0.9 + 0.4455 + 0.334 + 0.001 = 96.1805$$

This value (96.1805) for the relevance parameter (RP) is then used to decide whether a new document is worth evaluating. In one or more embodiments of the present invention, new documents with high RPs are given greater preference for evaluation than new documents with relatively lower RPs. In an alternative embodiment of the present invention, new documents with low RPs are given greater preference for evaluation than new documents with relatively higher RPs.

Figure 4:
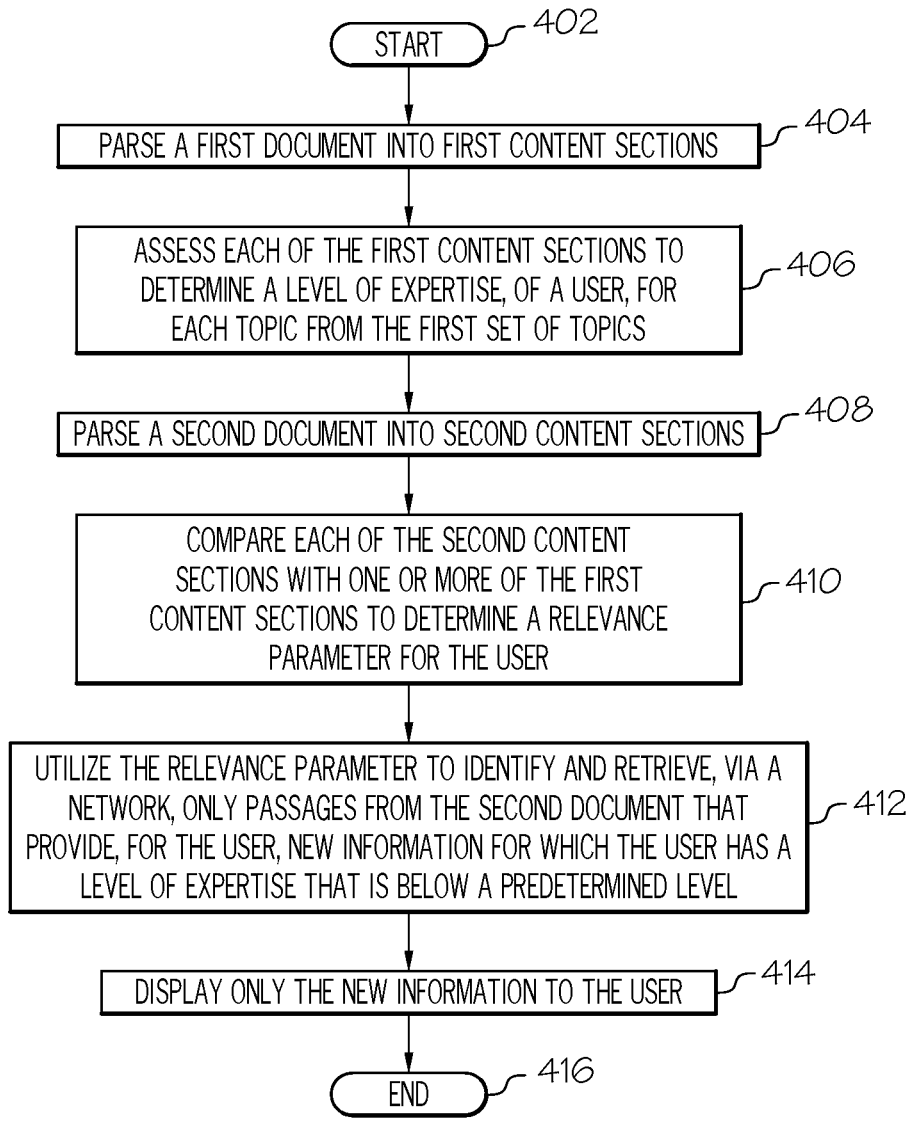
FIG. 4 is a high level flow chart of one or more steps performed by one or more processors and/or other hardware devices to selectively disseminate content over a network in accordance with one or more embodiments of the present invention.

With reference now to FIG. 4, a high level flow chart of one or more steps performed by one or more processors and/or other hardware devices to selectively disseminate content over a network in accordance with one or more embodiments of the present invention is presented.

After initiator block 402, one or more processors (e.g., processor 103 shown in FIG. 1) parse a first document (e.g., existing document A shown in FIG. 2) into first content sections (as depicted in cells A:1, A:2, and A:3), as described in block 404. The first content sections are parsed according to a first set of topics (e.g., Topic A1, Topic A2, Topic A3), and each of the first content sections is devoted to a particular first topic from the first set of topics.

As described in block 406, one or more processors assess each of the first content sections to determine a level of expertise, of a user, for each topic from the first set of topics.

For example, the level of expertise, of the user, for each topic from the first set of topics may be based on documents that the user has previously read about each topic from the first set of topics (e.g., the user's past "reading list"), as shown in his/her profile, as gleaned from an on-line reading history, etc.

In a further embodiment/example, the level of expertise, of the user, for each topic from the first set of topics may be based on documents that the user has previously authored about each topic from the first set of topics (e.g., articles published on line, etc.).

In a further embodiment/example, the level of expertise, of the user, for each topic from the first set of topics may be based on topics about which the user has taught (e.g., a record of the user teaching a class, leading a seminar/meeting, etc. about specific topics).

As described in block 408 of FIG. 4, one or more processors parse a second document (e.g., one or more of the new documents 204 shown in FIG. 2) into second content sections (e.g., depicted in cells X1-Z3 in FIG. 2). These second content sections are parsed according to a second set of topics (e.g., Topic X1/A1, Topic X2/A2, etc.). Each of the second content sections is devoted to a particular second topic from the second set of topics, as depicted in and described for FIG. 2.

As described in block 410 of FIG. 4, one or more processors compare one or more of the second content sections with one or more of the first content sections to determine a relevance parameter for the user. That is, the relevance parameter describes the level of expertise, of the user, for each topic from the first set of topics that is also found in the second document. This leads to the determination of how relevant a new document is to the needs (i.e., lack of knowledge) of the user.

As described in Formula 1 presented above, this relevance parameter may be determined according to a summation of a weighted value for a document name of the second document, a weighted value for a document subject of the second document, a weighted value of an age of the second document, a weighted value for a quantity of the second content sections that provide more than a first amount (e.g., >75%) of new information for the user, a weighted value for a quantity of the second content sections that provide new information for the user that is within a second level range (e.g., between 25% and 75%), and a weighted value for a quantity of the second content sections that provide less than a third level (e.g., <25%) of new information for the user.

As described in block 412 of FIG. 4, one or more processors utilize the relevance parameter to identify and retrieve, via a network (e.g., from new documents server 151 to computer 101 via network 127), only passages from the second document that provide, for the user, new information for which the user has a level of expertise that is below a predetermined level. That is, the relevance parameter not only initially identifies which documents should be evaluated (e.g., based on their title, subject line, age), but also which passages from identified new documents are relevant to the user (based on the amount of new material found in various sections of the identified new documents).

Once the significant/new information from the new document(s) is identified, one or more processors display (e.g., on display 109 shown in FIG. 1) only the new information to the user (see block 414), thus reducing the amount of bandwidth consumed by sending content from the new documents server 151 to the computer 101.

The flow chart ends at terminator block 416.

In an embodiment of the present invention and as depicted in FIG. 3, one or more processors summarize the new information (see new document summary 309 in FIG. 3), and display the summary of the new information to the user (with or without the new information shown in section 305 in FIG. 3).

In an embodiment of the present invention, one or more processors determine, for the user, a level of proficiency with material from one or more of the second content sections; identify a second content section whose content exceeds the level of proficiency for the user; and display the second content section whose content exceeds the level of proficiency for the user. That is, assume that the user who has read existing document 202 has a certain level of expertise (proficiency) in the material found in both existing document 202 as well as new documents 204. However, assume that an education transcript record for the user, a profile entry for the user, etc. indicate that this level of expertise is relatively low, and thus the user is not in command of the topic. That is, this user still has a hard time understanding the material in the existing document 202 and/or the material in the new documents 204. As such, some or even all material from the new documents 204 that overlaps with the material from the existing document 202 is sent to the user, even though he/she has read or is otherwise familiar with the material found in existing document 202.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
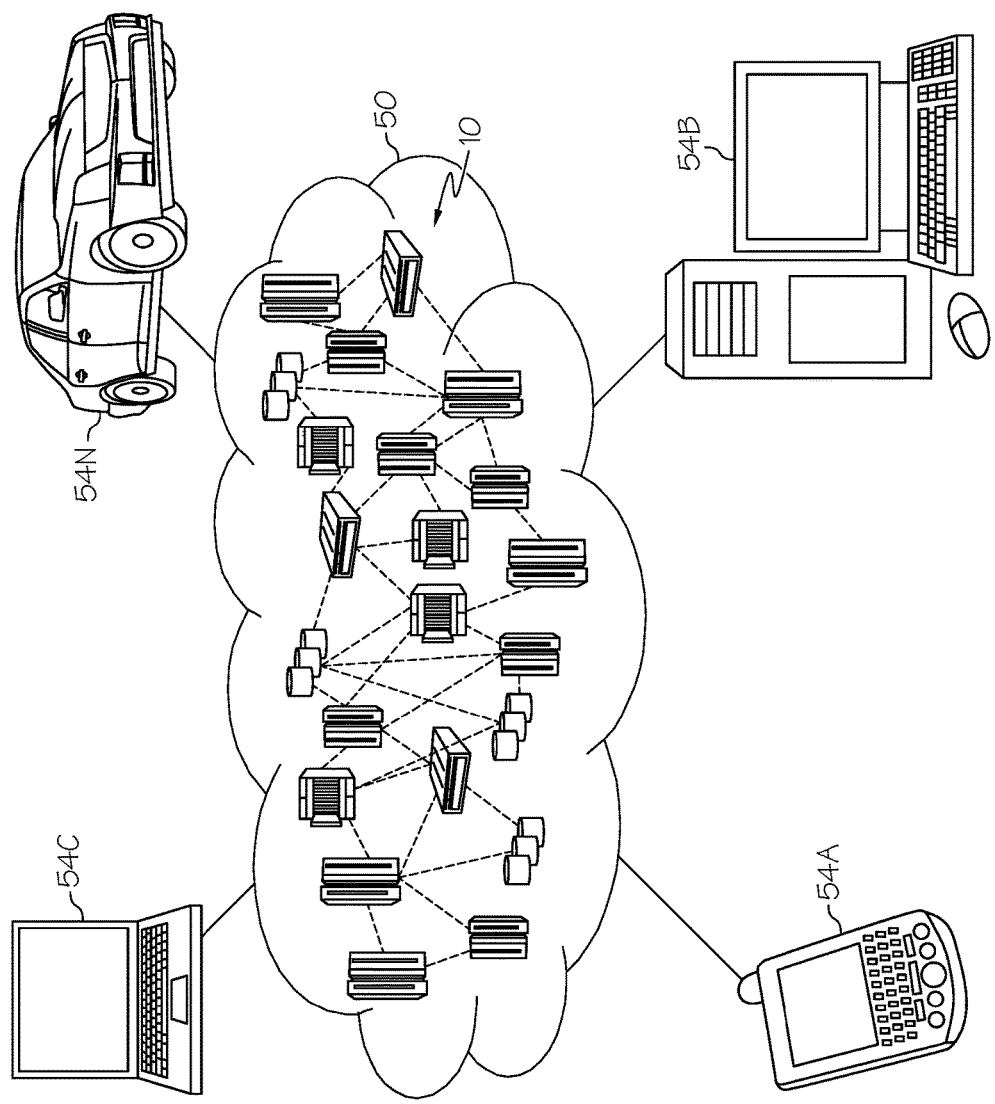
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
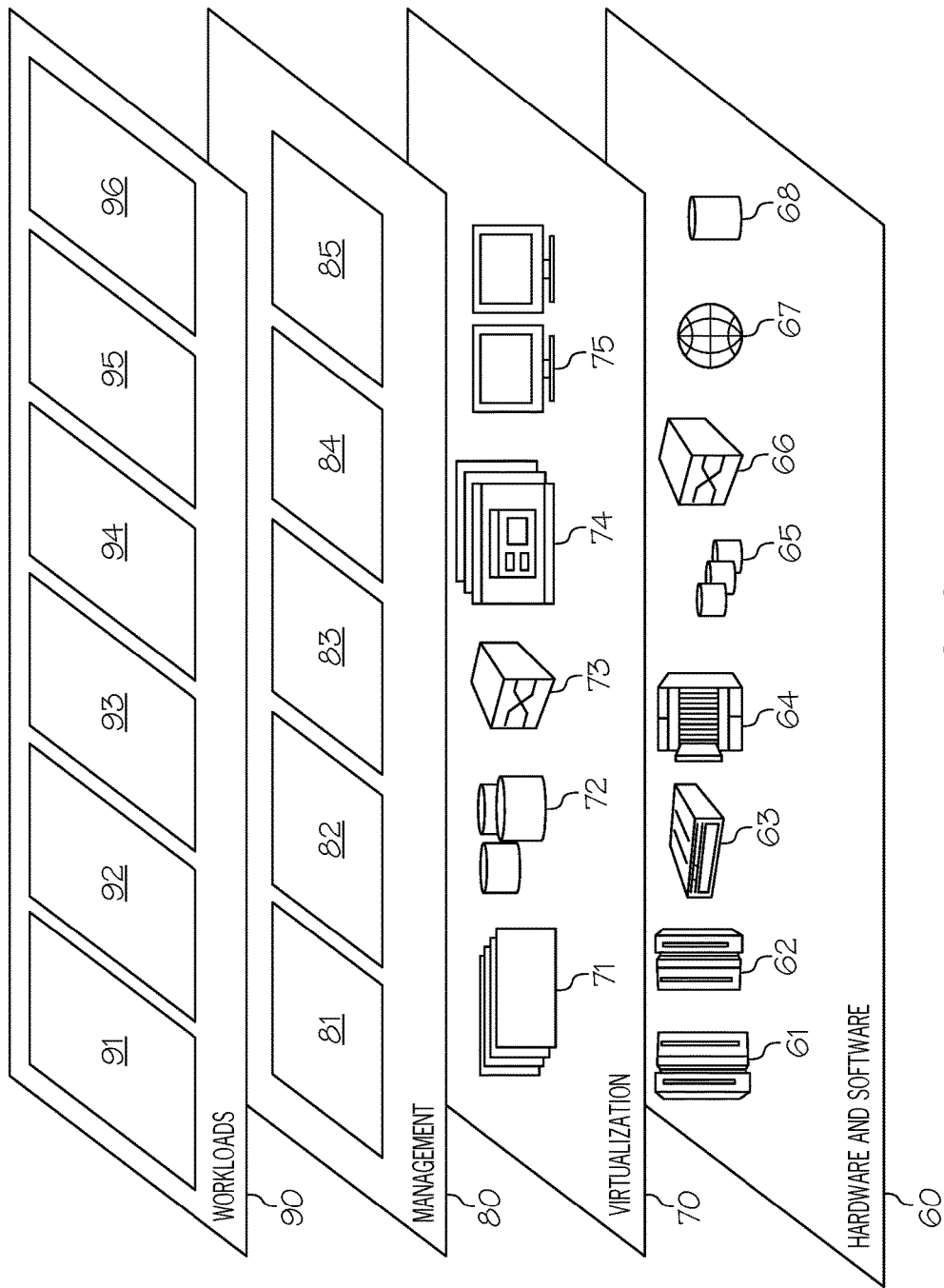
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective content dissemination processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of selectively disseminating content over a network, the computer-implemented method comprising:

parsing, by one or more processors, a first document into first content sections, wherein the first content sections are parsed according to a first set of topics, and wherein each of the first content sections is devoted to a particular first topic from the first set of topics;

parsing, by one or more processors, a test document into second content sections, wherein the second content sections are parsed according to a second set of topics, wherein each of the second content sections is devoted to a particular second topic from the second set of topics, and wherein the test document is known to contain a predefined level of test new information beyond that presented in the first document;

comparing, by one or more processors, one or more of the second content sections to one or more of the first content sections;

generating, by one or more processors, a relevance parameter for the test document based on the comparing of the one or more second content sections to the one or more of the first content sections, wherein the relevance parameter is a summation of a weighted value for a document name of the test document as weighted by a first weight, a weighted value for a document subject of the test document as weighted by a second weight, a weighted value of an age of the test document as weighted by a third weight, a weighted value for a quantity of test document sections that provide more than a first level of the test new information for a user as weighted by a fourth weight, a weighted value for a quantity of the test document sections that provide the test new information for the user that is within a second level range as weighted by a fifth weight, and a weighted value for a quantity of the test document sections that provide less than a third level of the test new information for the user as weighted by a sixth weight;

adjusting, by one or more processors, the first weight, the second weight, the third weight, the fourth weight, the fifth weight, and the sixth weight until the relevance parameter exceeds a predefined relevance parameter value in order to create a verified weighted relevance parameter;

utilizing, by one or more processors, the verified weighted relevance parameter to identify and retrieve, via a network, only one or more new documents that have a relevance parameter that exceeds the verified weighted relevance parameter in order to provide, for the user, new information from the one or more new documents for which the user has a level of expertise that is below a predetermined level; and displaying, by one or more processors, only the new information from the one or more new documents to the user.

2. The computer-implemented method of claim 1, further comprising:

determining, by one or more processors, the level of expertise of the user, for each topic from the first set of topics, based on a profile of the user that states that the user is an expert on one or more topics from the first set of topics.

3. The computer-implemented method of claim 1, further comprising:

determining, by one or more processors, the level of expertise, of the user, for each topic from the first set of topics based on documents that the user has previously read about each topic from the first set of topics.

4. The computer-implemented method of claim 1, further comprising:

determining, by one or more processors, the level of expertise, of the user, for each topic from the first set of topics based on documents that the user has previously authored about each topic from the first set of topics.

5. The computer-implemented method of claim 1, further comprising:

determining, by one or more processors, the level of expertise, of the user, for each topic from the first set of topics based on topics about which the user has taught.

6. The computer-implemented method of claim 1, further comprising:

determining, by one or more processors and for the user, a level of proficiency with material from one or more content sections from the one or more new documents;

identifying, by one or more processors, a content section from the one or more new documents whose content exceeds the level of proficiency for the user; and displaying, by one or more processors, the content section from the one or more new documents whose content exceeds the level of proficiency for the user.

7. The computer-implemented method of claim 1, further comprising:

summarizing, by one or more processors, the new information from the one or more new documents; and displaying, by one or more processors, only a summary of the new information from the one or more new documents to the user.

8. A computer program product for selectively disseminating content over a network, the computer program product comprising a non-transitory computer readable storage device having program instructions embodied therewith, the program instructions readable and executable by a computer to perform a method comprising:

parsing a first document into first content sections, wherein the first content sections are parsed according to a first set of topics, and wherein each of the first content sections is devoted to a particular first topic from the first set of topics;

parsing a test document into second content sections, wherein the second content sections are parsed according to a second set of topics, wherein each of the second content sections is devoted to a particular second topic from the second set of topics, and wherein the test document is known to contain a predefined level of test new information beyond that presented in the first document;

comparing one or more of the second content sections to one or more of the first content sections;

generating a relevance parameter for the test document based on the comparing of the one or more second content sections to the one or more of the first content sections, wherein the relevance parameter is a summation of a weighted value for a document name of the test document as weighted by a first weight, a weighted value for a document subject of the test document as weighted by a second weight, a weighted value of an age of the test document as weighted by a third weight, a weighted value for a quantity of test document sections that provide more than a first level of the test new information for a user as weighted by a fourth weight, a weighted value for a quantity of the test document sections that provide the test new information for the user that is within a second level range as weighted by a fifth weight, and a weighted value for a quantity of the test document sections that provide less than a third level of the test new information for the user as weighted by a sixth weight;

adjusting the first weight, the second weight, the third weight, the fourth weight, the fifth weight, and the sixth weight until the relevance parameter exceeds a predefined relevance parameter value in order to create a verified weighted relevance parameter;

utilizing the verified weighted relevance parameter to identify and retrieve, via a network, only one or more new documents that have a relevance parameter that exceeds the verified weighted relevance parameter in order to provide, for the user, new information from the one or more new documents for which the user has a level of expertise that is below a predetermined level; and displaying only the new information from the one or more new documents to the user.

9. The computer program product of claim 8, wherein the method further comprises:

determining the level of expertise of the user, for each topic from the first set of topics, based on the user being part of a group that works on one or more topics from the first set of topics.

10. The computer program product of claim 8, wherein the method further comprises:

determining the level of expertise, of the user, for each topic from the first set of topics based on documents that the user has previously read about each topic from the first set of topics.

11. The computer program product of claim 8, wherein the method further comprises:

determining the level of expertise, of the user, for each topic from the first set of topics based on documents that the user has previously authored about each topic from the first set of topics.

12. The computer program product of claim 8, wherein the method further comprises:

determining the level of expertise, of the user, for each topic from the first set of topics based on topics about which the user has taught.

13. The computer program product of claim 8, wherein the method further comprises:

determining, for the user, a level of proficiency with material from one or more content sections from the one or more new documents;

identifying a content section from the one or more new documents whose content exceeds the level of proficiency for the user; and displaying the content section from the one or more new documents whose content exceeds the level of proficiency for the user.

14. The computer-implemented method of claim 1, further comprising:

identifying, by one or more processors, old information in the first document, wherein the old information in the first document is identified by the one or more processors as being information that the user read before a predetermined length of time before a current date;

modifying, by one or more processors, said displaying such that the old information is also displayed to the user.

15. The computer program product of claim 8, wherein the program instructions are provided as a service in a cloud environment.

16. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to parse a first document into first content sections, wherein the first content sections are parsed according to a first set of topics, and wherein each of the first content sections is devoted to a particular first topic from the first set of topics;

program instructions to parse a test document into second content sections, wherein the second content sections are parsed according to a second set of topics, wherein each of the second content sections is devoted to a particular second topic from the second set of topics, and wherein the test document is known to contain a predefined level of test new information beyond that presented in the first document;

program instructions to compare one or more of the second content sections to one or more of the first content sections program instructions to generate a relevance parameter for the test document based on the comparing of the one or more second content sections to the one or more of the first content sections, wherein the relevance parameter is a summation of a weighted value for a document name of the test document as weighted by a first weight, a weighted value for a document subject of the test document as weighted by a second weight, a weighted value of an age of the test document as weighted by a third weight, a weighted value for a quantity of test document sections that provide more than a first level of the test new information for a user as weighted by a fourth weight, a weighted value for a quantity of the test document sections that provide the test new information for the user that is within a second level range as weighted by a fifth weight, and a weighted value for a quantity of the test document sections that provides less than a third level of the test new information for the user as weighted by a sixth weight;

program instructions to adjust the first weight, the second weight, the third weight, the fourth weight, the fifth weight, and the sixth weight until the relevance parameter exceeds a predefined relevance parameter value in order to create a verified weighted relevance parameter;

program instructions to utilize the verified weighted relevance parameter to identify and retrieve, via a network, only one or more new documents that have a relevance parameter that exceeds the verified weighted relevance parameter in order to provide, for the user, new information from the one or more new documents for which the user has a level of expertise that is below a predetermined level; and program instructions to display only the new information from the one or more new documents to the user.

17. The computer-implemented method of claim 1, further comprising:

determining, by one or more processors, a first portion of the new information from the one or more new documents for which the user has a first level of expertise, wherein having more that the first level of expertise in the first portion of the new information from the one or more new documents indicates that the user knows the first portion of the new information from the one or more new documents;

determining, by one or more processors, a second portion of the new information from the one or more new documents for which the user has a level of expertise that is below a second level of expertise, wherein having less than the second level of expertise in the second portion of the new information from the one or more new documents indicates that the user does not know the second portion of the new information from the one or more new documents;

summarizing, by one or more processors, the second portion of the new information from the one or more new documents in order to create a summarized second portion of the new information;

shading, by one or more processors, the first portion of the new information from the one or more new documents on a display; and displaying, by one or more processors, the summarized second portion of the new information from the one or more new documents on the display.

18. The computer-implemented method of claim 1, further comprising:

determining, by one or more processors, a portion of the new information from the one or more new documents that the user has an expertise in, wherein the expertise of the user indicates that the user already knows the portion of the new information from the one or more new documents; and blocking, by one or more processors, the portion of the new information from the one or more new documents that the user has the expertise in from being displayed to the user.

19. The computer-implemented method of claim 1, further comprising:

retrieving, by one or more processors, a published on-line article by the user about a topic from the first set of topics; and determining, by one or more processors, the level of expertise of the user, for each topic from the first set of topics, based on the user having published the on-line article about the topic from the first set of topics.

20. The computer-implemented method of claim 3, further comprising:

in response to determining that the level of expertise, of the user, for each topic from the first set of topics based on documents that the user has previously read is below a predetermined level, re-presenting, by one or more processors, the documents that the user has previously read.

* * * * *